H. B. KEIPER.
AUDIBLE SPEED INDICATOR.
APPLICATION FILED JUNE 16, 1916.

1,217,773.

Patented Feb. 27, 1917.

Inventor
Henry B. Keiper
By Julian C. Dowell
his Attorney

UNITED STATES PATENT OFFICE.

HENRY B. KEIPER, OF LANCASTER, PENNSYLVANIA, ASSIGNOR TO CHAMPION BLOWER & FORGE COMPANY, OF LANCASTER, PENNSYLVANIA, A CORPORATION OF PENNSYLVANIA.

AUDIBLE SPEED-INDICATOR.

1,217,773.  Specification of Letters Patent.  Patented Feb. 27, 1917.

Application filed June 16, 1916. Serial No. 104,041.

*To all whom it may concern:*

Be it known that I, HENRY B. KEIPER, a citizen of the United States, residing at Lancaster, in the county of Lancaster and State of Pennsylvania, have invented certain new and useful Improvements in Audible Speed-Indicators; and I do hereby declare the following to be a full, clear, and exact description of the invention, such as will enable others skilled in the art to which it appertains to make and use the same.

This invention relates to speed indicators for centrifugal machines, and more particularly to audible speed indicators of the type used on centrifugal cream separators.

In order to get a uniform result in separating cream from milk by means of a centrifugal cream separator, a uniform speed is essential, especially in hand-power separators, which are often used by inexperienced persons, who are liable to operate the crank at a greater or less speed than is desirable or necessary to effect the desired separation. In actual use the speed of the indicator varies so greatly that there is a decided difference in the thickness of the cream, and oftentimes there is an incomplete separation of the cream from the skimmed milk. Cream separators are usually built to be run at a certain definite speed and if the wheel or crank handle is turned at the correct speed, all other conditions being right, the desired separation will be effected; but if turned too slowly, the machine will not generate its full separating force, and the butter fat will not be separated out; the cream will be thinner than it should be and some of the butter flat will come out with the skimmed milk; and if the machine is turned too fast, there is a tendency to condense the cream, which will become so thick under continued rapid rotation of the separating device that it will stick to the walls of the bowl and cream bucket, resulting in great waste, and there is also a waste of energy and unnecessary wear.

The objects of my invention are to overcome these objections and to provide an improved audible speed indicator adapted to be fixed on the crank handle or wheel or other rotating part of a centrifugal machine and combining in its construction means for emitting an unmuffled clear and distinct bell ringing sound so long as the machine is running too slowly, together with means to prevent emitting any sound at all when the correct speed is attained, and especially designed for use on centrifugal cream separators, whereby the operator is enabled to keep the machine running at the desired rate of speed without visual inspection of an indicator by which the speed at which the machine is running may be ascertained.

A preferred form of embodiment of my invention is illustrated in the accompanying drawings, which are to be taken as a part of this specification, and in which—

Figure 1:
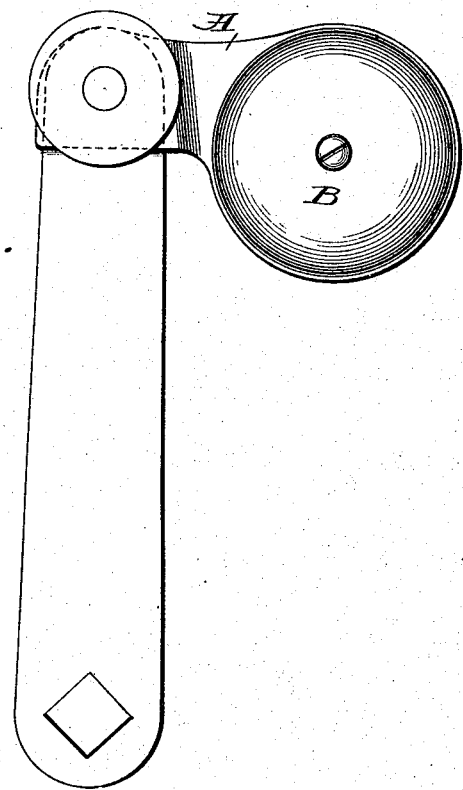
Figure 1 represents a side elevation of my improved audible speed indicator operatively attached to the crank handle of a centrifugal cream separator.
Figure 3:
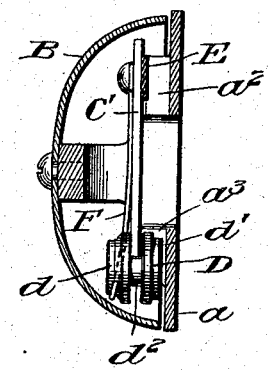
Fig. 3 is a transverse section, taken on the line 3—3 of Fig. 2.
Figure 4:
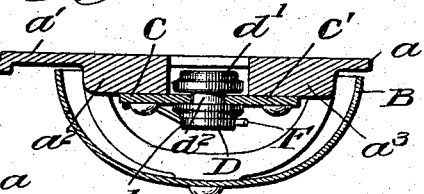
Fig. 4 is a section taken on the line 4—4 of Fig. 2 at right angles to the section shown in Fig. 3.
Figure 2:
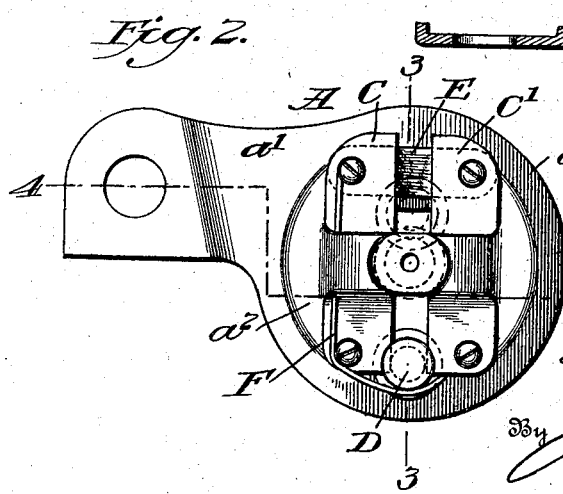
Fig. 2 is a side elevation of the supporting bracket and associated parts detached; the gong or bell being removed.

Referring to said drawings, in which the same reference letters are used to denote corresponding parts in different views, the letter A may denote a supporting bracket for a bell or gong B, adapted for attachment to the crank handle of a centrifugal machine and consisting preferably of a disk-like portion $a$, having a lateral arm $a^1$ with a hole therein to receive a fastening bolt entering a hole in the crank handle for securing the two parts together at right angles to each other, as shown in Fig. 1. The disk-like portion $a$, of the bracket, may be cast or formed with raised portions or bosses $a^2$, $a^3$, to which may be secured, by bolts or other fastening means, track plates C and $C^1$, which are spaced apart sufficiently to receive therebetween the connecting portion of a sliding hammer or bell-clapper D, which is adapted to slide back and forth along the guideway formed by said track plates. Said sliding hammer may consist of a head $d$, and a button-like member $d^1$, connected by an intermediate portion $d^2$, which latter fits in the space between the two track plates C and $C^1$ along which the hammer slides. The parts $d$, $d^1$, and $d^2$ are preferably integral, though they may be made separate and bolted or otherwise secured together. At one end of the guideway there is a fixed silent stop E, which may consist of a piece of leather, cloth or other suitable material spanning the space between the track plates and having its ends clamped between said plates and the bosses on which said plates are mounted; said stop being adapted to arrest the movement of the hammer without producing any sound; the hammer being indicated in dotted lines in Fig. 2 in engagement with said stop. At the other end of the guideway, which is lowermost when the crank handle is raised to its highest position, may be secured a resilient arm or spring F, arranged across the path of movement of the hammer to adapt it to yieldingly engage the hammer just before it strikes the gong and throw it back the instant the gong is struck, so as to adapt the bell to ring clearly with a sonorous tone and prevent muffling or deadening the sound. In the form shown, the spring F is L-shaped and has an eye at one end to receive one of the bolts used to secure one of the track plates to the supporting bracket, whereby the spring is clamped at said end between the head of the bolt and the track plate and extends to the opposite end of the guideway where it is bent around and across the path of movement of the hammer.

The track plates C and C¹ are radially disposed, or extend in the direction in which centrifugal force is exerted, and in operation, when the crank handle or wheel to which the device is attached reaches its highest position, in which position the track plates will be in a vertical plane, the bell-clapper or hammer will descend by gravity and strike the gong but by engagement with the retractile spring will be quickly thrown back the instant it strikes the gong, thus insuring a clear unmuffled bell ringing sound. As the movement of the crank handle continues the sliding hammer will be thrown against said silent stop, by centrifugal force or by the action of gravity and centrifugal force, without emitting any sound, and when the correct speed has been attained the movement of the hammer along the guideway by gravity to ring the bell will be overcome by centrifugal force and no sound will be emitted so long as the rotation continues at the correct speed. If the speed is greatly increased, the sliding hammer will be held stationary against the silent stop by centrifugal force, and no sound will be emitted until the speed is reduced below the desired limit, whereupon the hammer will again drop by gravity and strike the bell and will continue to strike it once during each revolution of the crank handle until the correct speed is again attained, at which time sufficient centrifugal force will be developed to prevent the bell from being struck, and by slightly slacking the movement at intervals sufficiently to permit the bell to be struck the operator may easily keep his machine running at a uniform speed so as to produce satisfactory results, and will be warned by a clear bell ringing sound once during each revolution of the crank handle when the speed is too slow, and by no sound at all when the correct speed has been attained.

Having thus described my invention, what I claim as new and desire to secure by Letters Patent of the United States is:

1. An attachment for centrifugal cream separators comprising a bracket adapted for attachment to a rotating member of the machine, a guideway on said bracket, a hammer adapted to travel along said guideway radially to the axis of rotation of said rotating member, non-sound producing means at or near one end of said guideway adapted to arrest the movement of said hammer in that direction, a sound producing device at or near the other end of said guideway adapted to be struck by said hammer when moving in that direction, and means associated therewith for engaging and throwing the hammer back the instant it strikes said device so as to prevent deadening the sound.

2. An audible speed indicator for centrifugal machines, comprising a rotatable support, a guideway carried by said support, a bell clapper adapted to be slid back and forth along said guideway by the action of centrifugal force in one direction and by the force of gravity in the opposite direction, a gong arranged to be struck by said clapper at the limit of its movement in one direction, and resilient means adapted to engage said clapper just before and throw it back the instant it strikes the gong so as to prevent deadening the sound.

3. An audible speed indicator for centrifugal machines, comprising a support adapted for attachment to a crank handle or other part having a rotary movement, a guideway carried by said support, a bell clapper movable back and forth along said guideway by gravity and centrifugal force respectively, due to the rotation of said support, a gong arranged to be hit by said clapper at the limit of its movement in one direction, non-sound producing means for limiting the movement of said clapper in the opposite direction, and resilient means adapted to engage said clapper just before it strikes said gong and throw it out of contact therewith the instant it is struck, so as to prevent deadening the sound.

4. In combination with a support mounted on a crank handle or other rotatable part of a centrifugal machine, parallel plates secured on said support and spaced apart so as to form a guideway extending substantially in the direction in which centrifugal force is exerted, a hammer movable along said guideway having slightly separated members fitting against opposite sides of said plates and an intermediate connecting portion arranged in the intervening space, a gong adapted to be struck by said hammer at the limit of its movement in one direction, and a spring adapted to engage said hammer as it strikes the gong and throw it out of contact therewith, so as to prevent deadening the sound.

5. The combination, in an audible speed indicator for centrifugal machines, of a fixed support mounted on a crank handle or other rotatable part, parallel plates secured on said support and spaced apart to form a guideway extending substantially in the direction in which centrifugal force is exerted, a slide movable along said guideway having members fitting against opposite sides of said plates and an intermediate portion connecting said members arranged in the space between said plates; said support having an arched portion or bridge spanning said guideway, and a cup-shaped gong fitting over said guideway having its rim in position to be struck by said slide at the limit of its movement in one direction; said gong being centrally apertured and provided with a set screw for securing it to said bridge.

6. The combination, in an audible speed indicator for centrifugal machines, of a fixed support mounted on a crank handle or other rotatable part, parallel plates secured on said support and spaced apart to form a guideway extending substantially in the direction in which centrifugal force is exerted, a slide movable along said guideway having members fitting against opposite sides of said plates and an intermediate portion connecting said members arranged in the space between said plates; said support having an arched portion or bridge spanning said guideway, and a cup-shaped gong fitting over said guideway having its rim in position to be struck by said slide at the limit of its movement in one direction; said gong being centrally apertured and provided with a set screw for securing it to said bridge, and a spring at one end of said intervening space adapted to engage said slide as it strikes the gong and throw it out of contact therewith.

7. An audible speed indicator comprising a supporting bracket adapted for attachment to the crank handle of a centrifugal machine, a guideway on said bracket extending radially to the axis of rotation, a hammer confined in said guideway so as to slide back and forth under the action of gravity and centrifugal force, respectively, a bell arranged to be struck by said hammer when moving in one direction and non-sound producing means for stopping said hammer when moving in the opposite direction together with means whereby the hammer is thrown back the instant it strikes the bell, so as to prevent deadening the sound.

In testimony whereof I affix my signature in the presence of two witnesses.

HENRY B. KEIPER.

Witnesses:
 CHAS. E. LONG,
 GEO. HAMMOND.